US012355149B1

(12) United States Patent
Willis

(10) Patent No.: US 12,355,149 B1
(45) Date of Patent: Jul. 8, 2025

(54) WAVEGUIDE HORN ANTENNA

(71) Applicant: Utah State University Space Dynamics Laboratory, North Logan, UT (US)

(72) Inventor: Bryan Jon Willis, North Logan, UT (US)

(73) Assignee: Utah State University Space Dynamics Laboratory, North Logan, UT (US)

( * ) Notice: Subject to any disclaimer, the term of this patent is extended or adjusted under 35 U.S.C. 154(b) by 176 days.

(21) Appl. No.: 18/330,210

(22) Filed: Jun. 6, 2023

(51) Int. Cl.
*H01Q 13/02* (2006.01)
*H01P 1/17* (2006.01)
*H01P 3/12* (2006.01)

(52) U.S. Cl.
CPC ............ *H01Q 13/02* (2013.01); *H01P 1/171* (2013.01); *H01P 3/12* (2013.01); *H01Q 13/0208* (2013.01); *H01Q 13/0283* (2013.01)

(58) Field of Classification Search
CPC ..... H01Q 13/02–0291; H01Q 21/0068; H01Q 21/0043–005; H01P 1/171; H01P 3/12
See application file for complete search history.

(56) References Cited

U.S. PATENT DOCUMENTS 3,109,996 A * 11/1963 Allen .................... H01Q 13/02 333/137
3,445,789 A * 5/1969 Rossini .................. H01P 1/262 333/252
6,201,508 B1 * 3/2001 Metzen .................. H01Q 21/00 343/778
8,217,839 B1 * 7/2012 Paulsen .................. H01Q 21/10 343/810
9,343,795 B1 * 5/2016 Halligan ................... H01P 5/16
9,666,927 B1 * 5/2017 Massman .................. H01P 5/19
9,923,256 B2 * 3/2018 Jensen .................... H01P 3/123
10,431,902 B2 * 10/2019 You ...................... H01Q 21/064
10,840,605 B2 * 11/2020 Hollenbeck ........ H01Q 21/0025
11,276,937 B2 * 3/2022 Bongard .............. H01Q 21/064
12,261,366 B1 * 3/2025 Wink ................... H01Q 21/064
2013/0120086 A1 * 5/2013 Sarasa Delgado ...... H01P 1/161 333/125
2013/0120206 A1 * 5/2013 Biancotto ............ H01Q 21/005 29/600

(Continued)

OTHER PUBLICATIONS

A Novel Corporate Feed Horn Sub-Array for the 77GHz Band (Year: 2018).*

(Continued)

*Primary Examiner* — Ab Salam Alkassim, Jr.

(57) ABSTRACT

For improved Ku band communications, an antenna system includes a planar antenna surface, at least one waveguide feed network, and a waveguide. The planar antenna surface is coupled to at least one port. The at least one waveguide feed network includes an H plane junction splitter and at least two E plane junction splitters. The H plane junction splitter is disposed on a channel septum in a channel. A splitter axis of the channel septum and the H plane junction splitter is rotated about a P axis. The at least two E plane junction splitters are each disposed on septum and coupled to the H plane junction splitter via the channel. The waveguide is coupled to the waveguide feed network.

19 Claims, 8 Drawing Sheets

(56) References Cited

U.S. PATENT DOCUMENTS

| | | | | |
|---|---|---|---|---|
| 2015/0229460 | A1* | 8/2015 | Mohamadi | B33Y 10/00 375/130 |
| 2016/0211582 | A1* | 7/2016 | Saraf | H01Q 21/064 |
| 2016/0254582 | A1* | 9/2016 | Jensen | G06F 30/00 343/853 |
| 2016/0351984 | A1* | 12/2016 | Jensen | H01P 1/173 |
| 2017/0047661 | A1* | 2/2017 | Parekh | H01Q 19/028 |
| 2017/0077610 | A1* | 3/2017 | Bongard | H01Q 13/0233 |
| 2017/0244173 | A1* | 8/2017 | Moon | H01Q 13/106 |
| 2018/0248240 | A1* | 8/2018 | Feng | H01P 1/39 |
| 2018/0309180 | A1* | 10/2018 | Nezakati | H01P 1/161 |
| 2019/0190161 | A1* | 6/2019 | Hollenbeck | H01Q 15/242 |
| 2020/0076066 | A1* | 3/2020 | Hollenbeck | B22F 10/80 |
| 2020/0076091 | A1* | 3/2020 | Catalani | H01Q 13/00 |
| 2020/0266510 | A1* | 8/2020 | Menargues Gomez | H01P 1/163 |
| 2021/0159607 | A1* | 5/2021 | Lim | H01P 5/12 |
| 2021/0249748 | A1* | 8/2021 | Fonseca | H01P 1/161 |
| 2021/0359422 | A1* | 11/2021 | You | H01Q 9/045 |
| 2022/0043197 | A1* | 2/2022 | Wrigley | G02B 5/3025 |
| 2023/0411860 | A1* | 12/2023 | Runyon | H01Q 21/064 |
| 2023/0420857 | A1* | 12/2023 | Garcia Tejero | G01S 7/027 |
| 2025/0070482 | A1* | 2/2025 | Clavijo | H01P 5/107 |

OTHER PUBLICATIONS

Bryan Willis; A Ku band Waveguide Horn Array with Sidelobe Supression; 2022 IEEE International Symposium on Antennas and Propagation and USNC-URSI Radio Science Meeting ; Jul. 10-15, 2022 (Year: 2022).*

* cited by examiner

WAVEGUIDE HORN ANTENNA

BACKGROUND INFORMATION

An antenna with improved performance is disclosed.

BRIEF DESCRIPTION

An antenna system is disclosed. The antenna system includes a planar antenna surface, at least one waveguide feed network, and a waveguide. The planar antenna surface is coupled to at least one port. The at least one waveguide feed network includes an H plane junction splitter and at least two E plane junction splitters. The H plane junction splitter is disposed on a channel septum in a channel. A splitter axis of the channel septum and the H plane junction splitter is rotated about a P axis. The at least two E plane junction splitters are each disposed on septum and coupled to the H plane junction splitter via the channel. A first septum and first E plane junction splitter are shifted along a positive P axis from a center of the channel to divide power from the first E plane junction splitter unequally without changing phase. A second septum and second E plane junction splitter are centered on the channel to maintain an equal amplitude taper. The waveguide is coupled to the waveguide feed network.

BRIEF DESCRIPTION OF DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The description of elements in each figure may refer to elements of proceeding figures. Like numbers refer to like elements in all figures, including alternate embodiments of like elements.

Figure 1A:
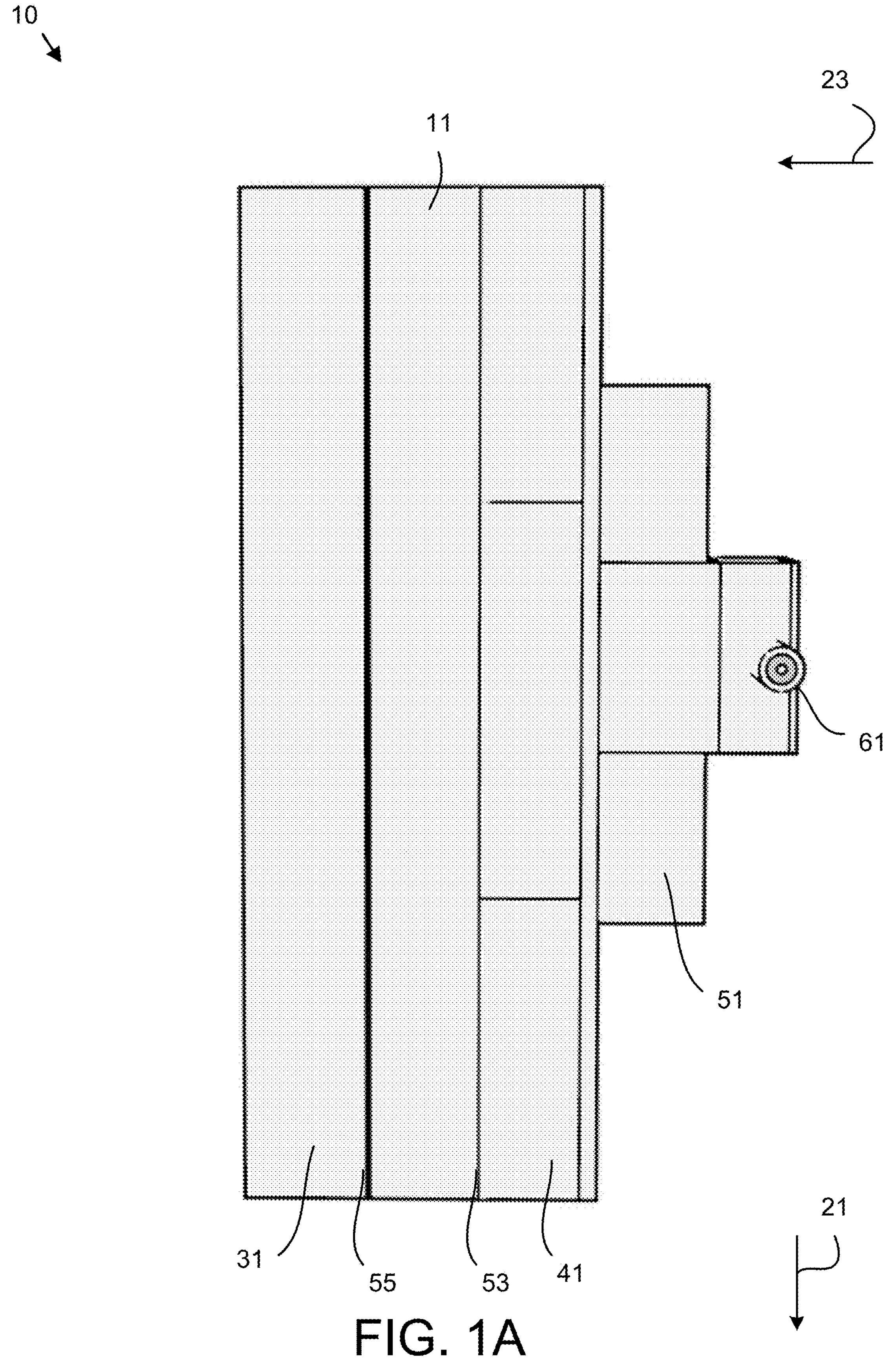
FIG. 1A is a front-view drawing illustrating one embodiment of an antenna system.

FIG. 1A is a front-view drawing illustrating one embodiment of an antenna system 10. In the depicted embodiment, the antenna system 10 includes a planar antenna surface 41 coupled to at least one port 61. The at least one port 61 may be an S21 port and/or an S31 port. In one embodiment, the at least one port 61 is coupled to the planar antenna surface 41 via a port structure 51. The planar antenna surface 41 may be formed of one or more blocks of metal. The planar antenna surface 41 may be machined, printed, and/or cast. The planar antenna surface 41 may include passages for connectors.

In the depicted embodiment, the planar antenna surface 41 is coupled to at least one waveguide feed network 11. The at least one waveguide feed network 11 is described in more detail in FIGS. 2A-B. The at least one waveguide feed network 11 has a proximal side 53 and a distal side 55.

In the depicted embodiment, the at least one waveguide feed network 11 is coupled to a waveguide 31. The waveguide 31 is described in more detail in FIGS. 4A-B. An E axis 23 of an E-plane reference plane and an H axis 21 of an H-plane reference axis are also shown.

Figure 1B:
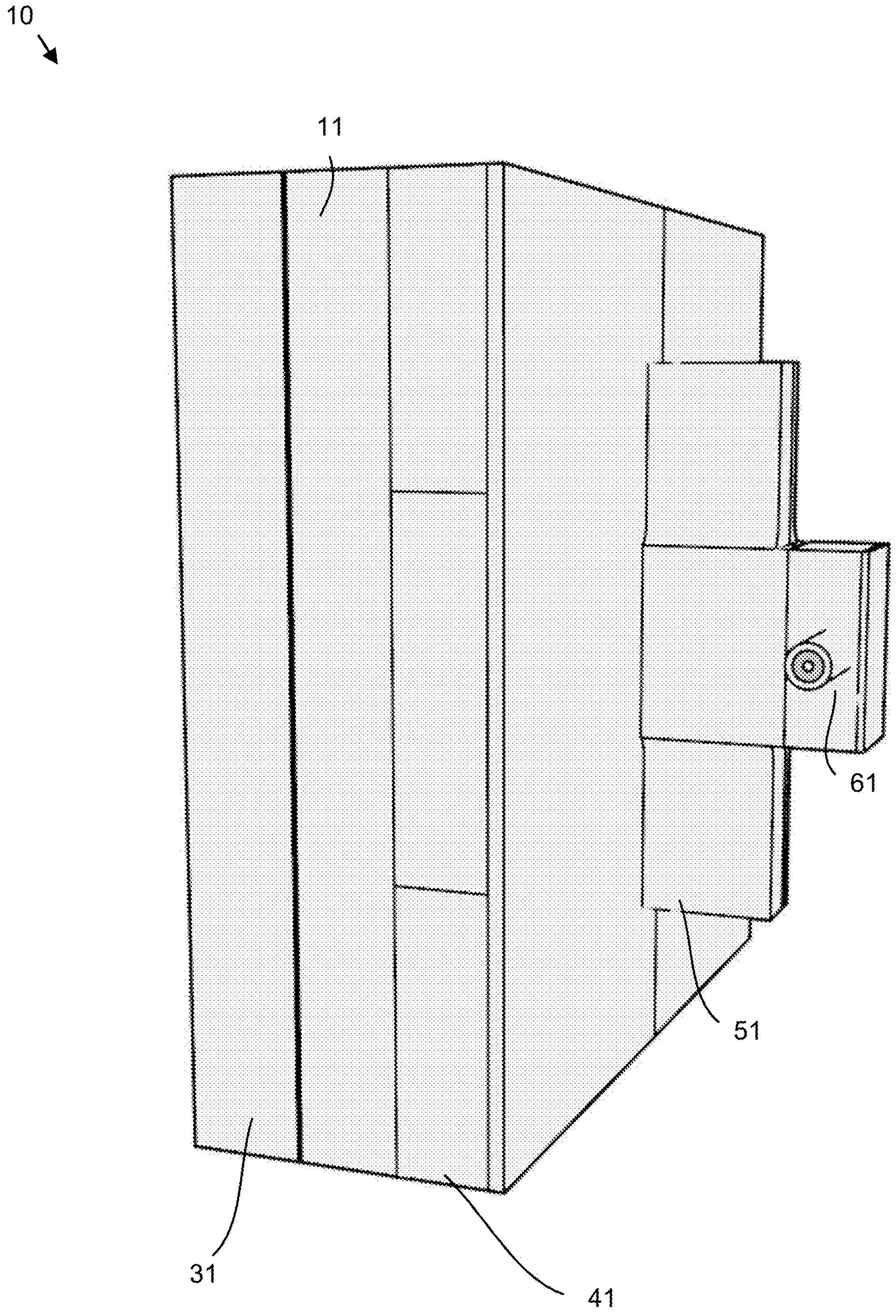
FIG. 1B is a perspective-view drawing illustrating one embodiment of an antenna system.

FIG. 1B is a perspective-view drawing illustrating one embodiment of the antenna system 10. The at least one port 61, the port structure 51, the planar antenna surface 41, the at least one waveguide feed network 11, and the waveguide 31 are shown.

The antenna system 10 may radiate a Ku band signal. The site lobes in the radiated Ku band signal may be reduced by at least 8 Decibels (dB) by employing the embodiments described herein. In one embodiment, the Ku band is 10.7 Gigahertz (GHz) to 12.75 GHz.

Figure 2A:
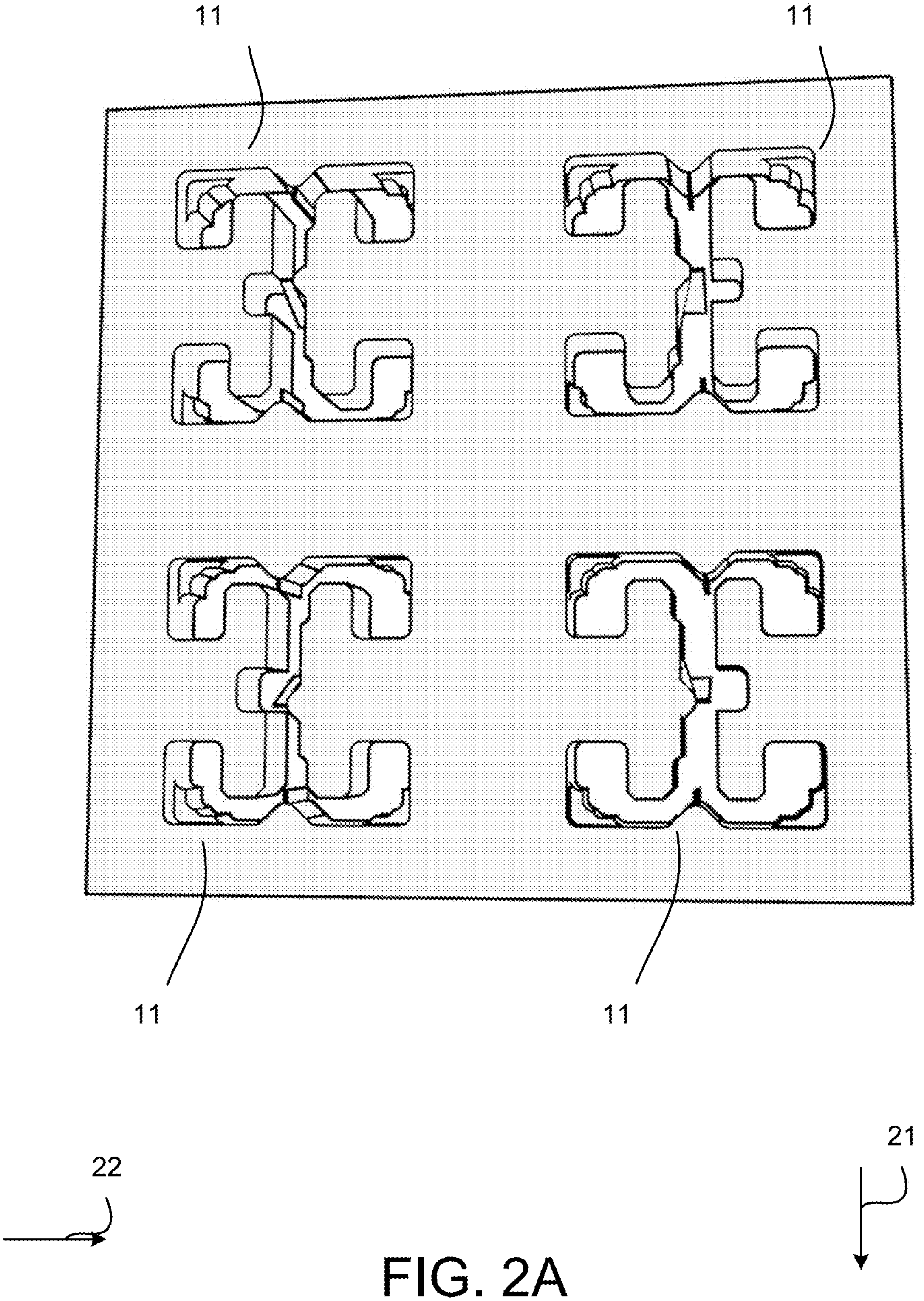
FIG. 2A is a front-view drawing illustrating one embodiment of waveguide feed networks.

FIG. 2A is a front-view drawing illustrating one embodiment of waveguide feed networks 11. In the depicted embodiment, four waveguide feed networks 11 are employed. However, embodiments may employ any number of waveguide feed networks 11. The H axis 21 of the H-plane is also shown. In addition, a P axis 22 is shown that is orthogonal to both the E axis 23 and the H axis 21. The waveguide feed network 11 may be three-dimensionally (3D) printed as metal layers.

Figure 2B:
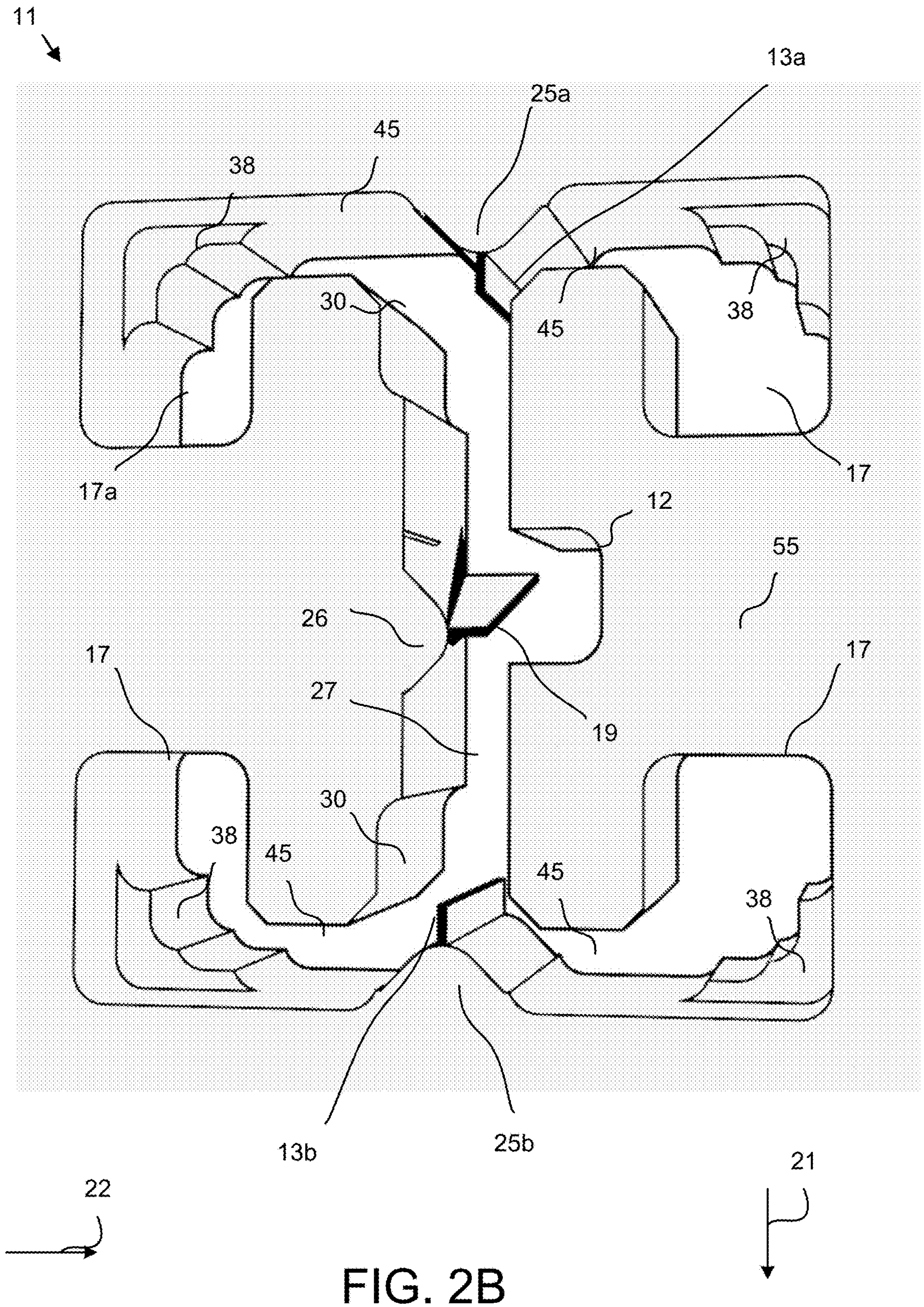
FIG. 2B is a perspective drawing illustrating one embodiment of a waveguide feed network.
Figure 3A:
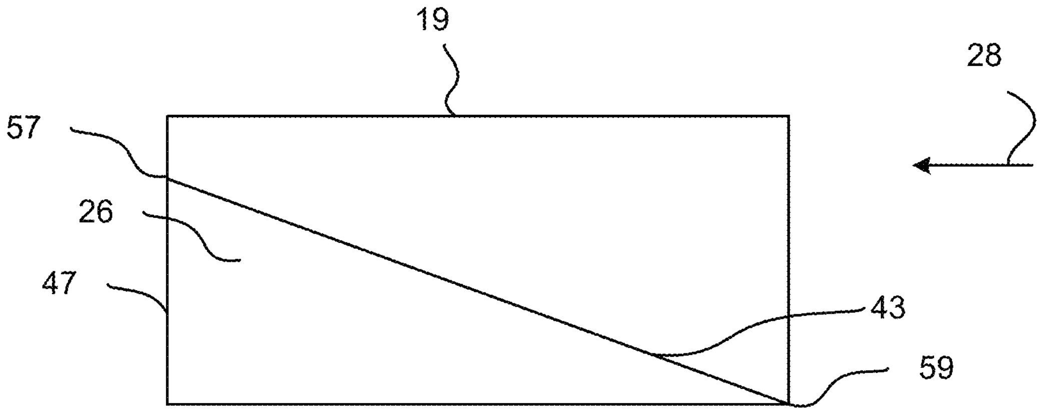
FIG. 3A is a side-view drawing illustrating one embodiment of an H plane junction splitter and channel septum.

FIG. 2B is a perspective drawing illustrating one embodiment of a waveguide feed network 11 of the at least one waveguide feed network 11 of FIG. 2A. The H axis 21 and the P axis 22 are also shown. In the depicted embodiment, the waveguide feed network 11 includes a channel 27. A channel septum 26 is positioned in the channel 27. An H plane junction splitter 19 is disposed on the channel septum 26 in the channel 27. In one embodiment, a splitter axis of the channel septum 26 and the H plane junction splitter 19 is rotated about the P axis 22. The splitter axis may be rotated in the range of 0.5 to 45 degrees about the P axis. The splitter axis is shown in FIG. 3A.

In one embodiment, a cavity 12 is formed opposite the channel septum 26 and the H plane junction splitter 19. The cavity 12 may modify the Ku band signal.

The waveguide feed network 11 further comprises at least two E plane junction splitters 13. Each E plane junction splitter 13 is disposed on a corresponding septum 25 and coupled to the H plane junction splitter 19 via the channel 27. Each septum 25 may be formed as the sloped protrusion into the channel 27. An E plane junction splitter 13 may be formed as a rectangle disposed on the septum 25.

A first septum 25*a* and a first E plane junction splitter 13*a* are shifted along a positive P axis 22 from the center of the channel 27. Shifting the first septum 25 a and the first E plane junction splitter 13*a* divides power from the first E plane junction splitter 13*a* unequally without changing a phase of the Ku band signal.

In one embodiment, the second septum 25*b* and the second E plane junction splitter 13*b* are centered on the channel 27. Centering the second septum 25*b* and the second E plane junction splitter 13*b* maintains an equal amplitude taper for the Ku band signal.

In one embodiment, the waveguide feed network 11 comprises at least two apertures 17 coupled to each E plane junction splitter 13*a-b*. Each aperture 17 may be coupled to a corresponding E plane junction splitter 13 via an aperture channel 45. A first aperture 17*a* may be coupled to the first E plane junction splitter 13*a* along a negative P axis 22. The first aperture 17*a* may radiate relatively more signal power than other apertures 17.

In one embodiment, the channel 27 comprises at least one cutout 30. Each cutout may correct for a phase difference in the KU band signal by slowing propagating waves in the channel 27 to match a phase of corresponding apertures 17.

In one embodiment, at least one aperture 17 comprises a matching guide 38. The matching guide 38 may be disposed in a corner of the aperture 17. The matching guide 38 may be disposed along the P axis 22 from the aperture channel 45. In the depicted embodiment, the matching guides 38 extend partially from the proximal side 53 of the waveguide feed network 11 along the E axis 23. Alternatively, a matching guide 38 may extend completely from the proximal side 53 of the waveguide feed network 11 to the distal side 55 of the waveguide feed network 11.

In one embodiment, the channel 27 comprises at least one cutout 30. The cutout may correct for a phase difference in the KU band signal by slowing propagating waves in the channel 27 to match a phase of the at least two apertures 17.

The H plane junction splitter 19, the channel septum 26, the at least two E plane junction splitters 13 and corresponding septums 25, the channel 27, and at least two apertures 17 and corresponding matching guides 38 of the waveguide feed network 11 may be 3D printed as metal layers, machined, cast, or the like.

FIG. 3A is a side-view drawing illustrating one embodiment of an H plane junction 19 splitter and channel septum 26. The H plane junction 19 splitter and channel septum 26 have a proximal end 59 and a distal end 57. In the depicted embodiment, the channel septum 26 has a planar slope 43 in the direction of the splitter axis 28, tapering to the proximal end 59. The planar slope 43 may have a constant slope. The planar slope 43 may match an S parameter of an E plane junction splitter 13. Alternatively, the planar slope 43 may have an exponential slope or a logarithmic slope. In one embodiment, the H plane junction 19 does not have a slope. The H plane junction 19 may be formed as rectangle embedded in the channel septum 26. In the depicted embodiment, the channel septum 26 includes a flat surface 47 on the distal end 57 that may be parallel to and/or flush with a surface of the waveguide feed network 11.

Figure 3B:
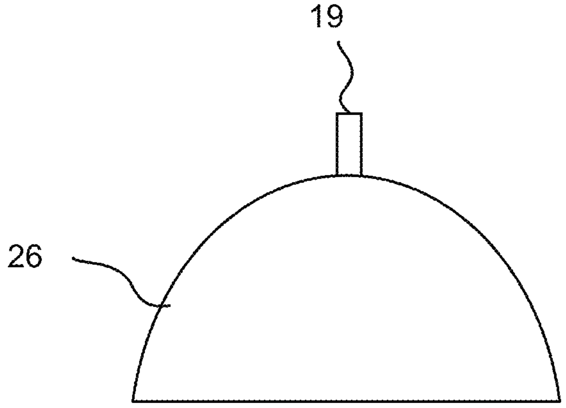
FIG. 3B is a top-view drawing illustrating one embodiment of an H plane junction splitter and channel septum.

FIG. 3B is a top-view drawing illustrating one embodiment of an H plane junction splitter 19 and a channel septum 26 as seen from the distal end 57. In the depicted embodiment, the profile of the H plane junction splitter 19 is rectangular. The profile of the channel septum 26 may be circular and/or oval.

Figure 3C:
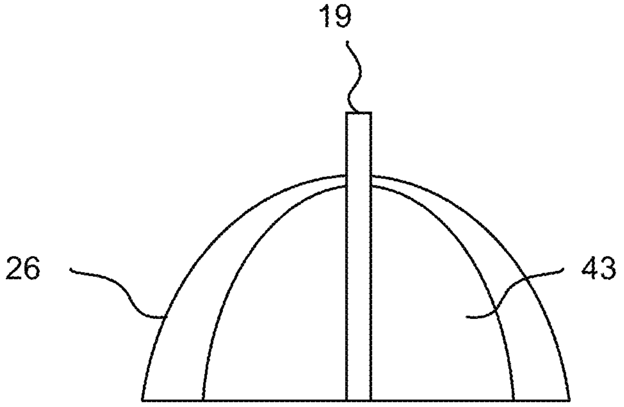
FIG. 3C is a bottom-view drawing illustrating one embodiment of an H plane junction splitter and channel septum.

FIG. 3C is a bottom-view drawing illustrating one embodiment of an H plane junction splitter 19 and a channel septum 26 as seen from the proximal end 59. The planar slope 43 is shown relative to the channel septum 26 and the H plane junction splitter 19. In one embodiment, the H plane junction splitter 19 and the channel septum 26 are rotated about the splitter axis 38 with the proximal end 59 closer to the first septum 25*a* and the first E plane junction splitter 13*a*.

Figure 4A:
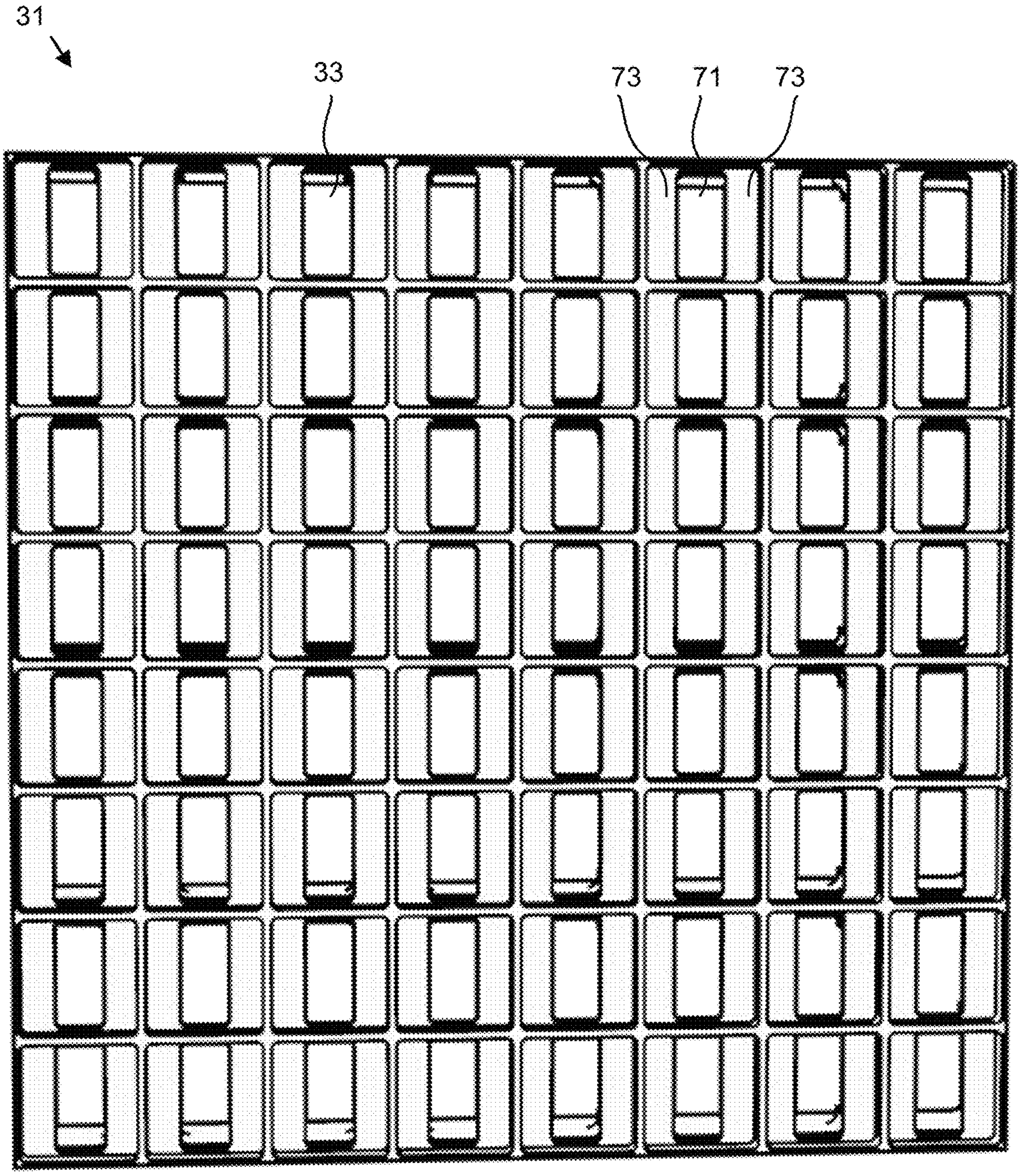
FIG. 4A is a front-view drawing illustrating one embodiment of a waveguide.

FIG. 4A is a front-view drawing illustrating one embodiment of a waveguide 31. In the depicted embodiment, the waveguide 31 comprises a plurality of waveguide blocks 33. In the depicted embodiment, 64 wave blocks 33 are disposed in an 8×8 waveguide array. Each waveguide block 33 may include a waveguide window 71 and two waveguide strips 73. The waveguide window 71 and waveguide strips 73 may be oriented longitudinally.

Figure 4B:
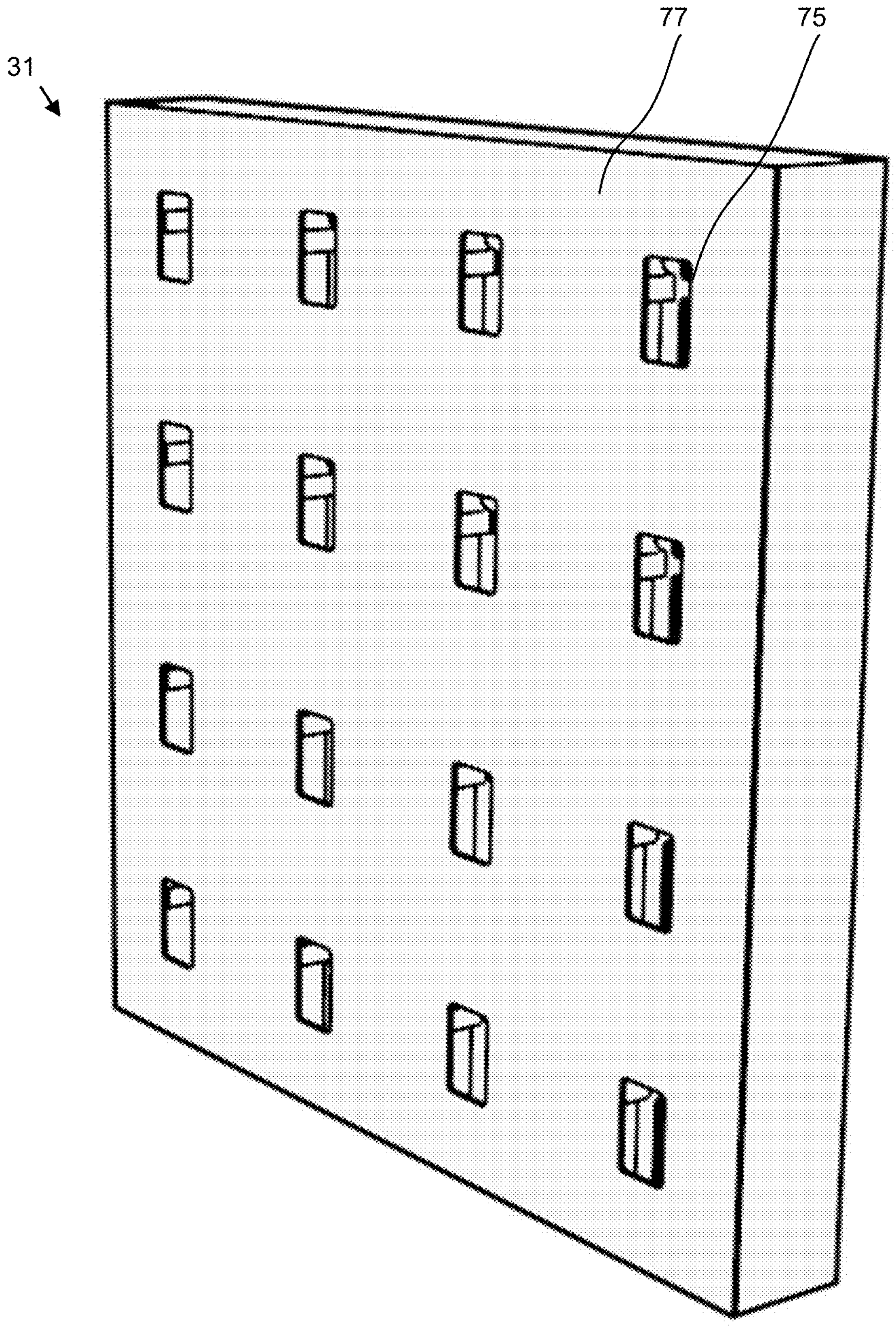
FIG. 4B is a perspective drawing illustrating one embodiment of a waveguide.

FIG. 4B is a perspective drawing illustrating one embodiment of the waveguide 31 of FIG. 4A. the waveguide 31 includes a waveguide surface 77 that is in communication with the waveguide feed network 11. At least one waveguide orifice 75 is formed in the waveguide surface 77. Each waveguide orifice 75 may correspond to an aperture 17 of a waveguide feed network 11. One waveguide orifice 75 may be formed for one or more waveguide blocks 33.

Figure 4C:
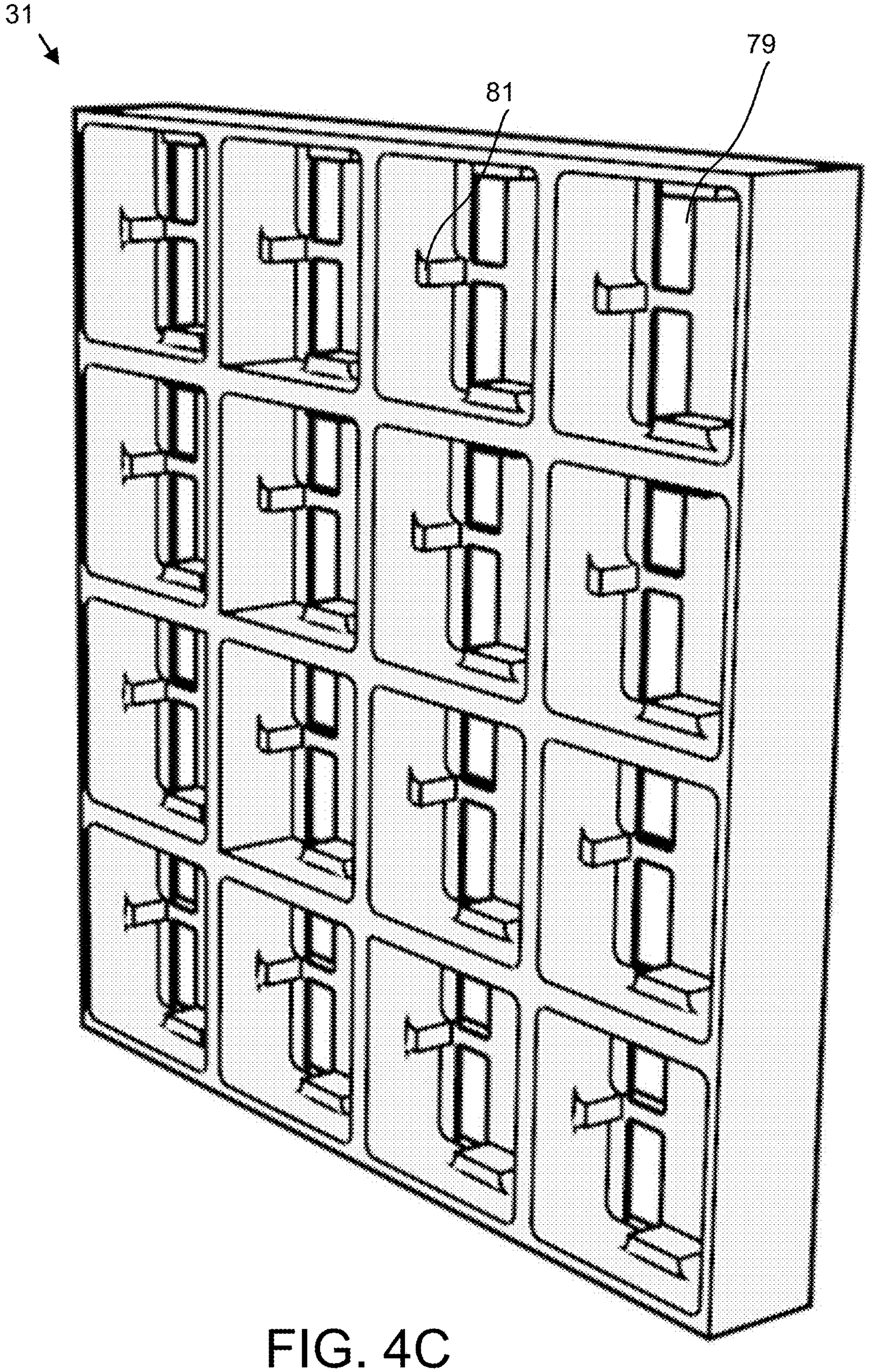
FIG. 4C is a perspective cut-away drawing illustrating one embodiment of a waveguide.

FIG. 4C is a perspective cut-away drawing illustrating one embodiment of the waveguide 31 of FIG. 4B. in the depicted embodiment, the waveguide surface 77 is cut away to show waveguide chambers 79. A waveguide chambers 79 may be coupled to each waveguide orifice 75. In the depicted embodiment, one waveguide chamber 79 is coupled to four waveguide blocks 33. A waveguide chamber 79 may be coupled to any number of waveguide blocks 33. At least one chamber stub 81 may be disposed on a side of a waveguide chamber 79. In the depicted embodiment, a chamber stub 81 is centered on each side of the waveguide chambers 79.

When communicating a Ku band signal, particularly from a satellite, improving the efficiency of the antenna system 10 may reduce the power demands of communications and increase reliability. The antenna system 10 employs an H plane junction splitter 19 and at least two E plane junction splitters 13 to reduce the sidelobes of the radiated Ku band signal by at least 8 dB to improve communications and communication efficiency.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An antenna system comprising:

a planar antenna surface coupled to at least one port;

at least one waveguide feed network comprising:

a first channel septum in a channel, the first channel septum having an oval profile and a planar slope in a direction to a proximal end;

an H plane junction splitter disposed on the first channel septum along a splitter axis with a top edge parallel the splitter axis and a rectangular profile orthogonal to the splitter axis, wherein the splitter axis of the first channel septum and the H plane junction splitter is rotated about a P axis;

at least two E plane junction splitters each disposed on a second and a third channel septum, respectively, and coupled to the H plane junction splitter via the channel, wherein the second channel septum and first E plane junction splitter are shifted along a positive P axis from a center of the channel to divide power from the first E plane junction splitter unequally without changing phase, a proximal end of the channel septum closer to the second channel septum and first E plane junction splitter than the third channel septum and second E plane junction splitter, and the third septum and second E plane junction splitter are centered on the channel to maintain an equal amplitude taper; and a waveguide coupled to the waveguide feed network.

2. The antenna system of claim 1, the waveguide feed network further comprising at least two apertures coupled to each E plane junction splitter, wherein a first aperture is coupled to the first E plane junction splitter along a negative P axis and radiates more signal power than other apertures.

3. The antenna system of claim 2, the waveguide feed network further comprising at least one cutout in the channel that correct for a phase difference by slowing propagating wave in the channel to match a phase of the at least two apertures.

4. The antenna system of claim 3, each of the at least two apertures further comprising a matching guide disposed in a corner of the aperture.

5. The antenna system of claim 1, wherein four waveguide feed networks are coupled to the planar antenna surface and the waveguide.

6. The antenna system of claim 1, the channel further comprising a cavity opposite the first channel septum and the H plane junction splitter.

7. The antenna system of claim 1, wherein the first channel septum planar slope matches an S parameter of the E plane junction splitters.

8. The antenna system of claim 1, wherein the waveguide comprises a plurality of waveguide blocks.

9. The antenna system of claim 8, wherein 64 waveguide blocks are disposed in an 8×8 waveguide array.

10. The antenna system of claim 1, wherein the planar antenna surface is coupled to an S21 port and an S31 port.

11. The antenna system of claim 1, wherein sidelobes in a radiated Ku band signal are reduced by at least 8 dB.

12. The antenna system of claim 1, wherein the waveguide feed network further comprises at least two apertures and corresponding matching guides and the H plane junction splitter, the channel first septum, the at least two E plane junction splitters and corresponding second and third septums, the channel, and the at least two apertures and the corresponding matching guides are three dimensionally (3D) printed as metal layers.

13. A waveguide feed network comprising:

a first channel septum in a channel, the first channel septum having an oval profile and a planar slope in a direction to a proximal end;

an H plane junction splitter disposed on the first channel septum along a splitter axis with a top edge parallel the splitter axis and a rectangular profile orthogonal to the splitter axis, where in the splitter axis of the first channel septum and the H plane junction splitter is rotated about a P axis; and at least two E plane junction splitters each disposed on a second and a third channel septum, respectively, and coupled to the H plane junction splitter via the channel, wherein the second channel septum and first E plane junction splitter are shifted along a positive P axis from a center of the channel to divide power from the first E plane junction splitter unequally without changing phase, a proximal end of the channel septum closer to the second channel septum and first E plane junction splitter than the third channel septum and second E plane junction splitter, and the third septum and second E plane junction splitter are centered on the channel to maintain an equal amplitude taper.

14. The waveguide feed network of claim 13, the waveguide feed network further comprising at least two apertures coupled to each E plane junction splitter, wherein a first aperture is coupled to the first E plane junction splitter along a negative P axis and radiates more signal power than other apertures.

15. The waveguide feed network of claim 14, the waveguide feed network further comprising at least one cutout in the channel that correct for a phase difference by slowing propagating wave in the channel to match a phase of the at least two apertures.

16. The waveguide feed network of claim 15, each of the at least two apertures further comprising a matching guide disposed in a corner of the aperture.

17. The waveguide feed network of claim 13, the channel further comprising a cavity opposite the first channel septum and the H plane junction splitter.

18. The waveguide feed network of claim 13, wherein the first channel septum has planar slope matches an S parameter of the E plane junction splitters.

19. The waveguide feed network of claim 13, further comprising at least two apertures and corresponding matching guides and wherein the H plane junction splitter, the first channel septum, the at least two E plane junction splitters and corresponding second and third septums, the channel, and the at least two apertures and the corresponding matching guides of the waveguide feed network are three dimensionally (3D) printed as metal layers.

* * * * *